Figure 1:
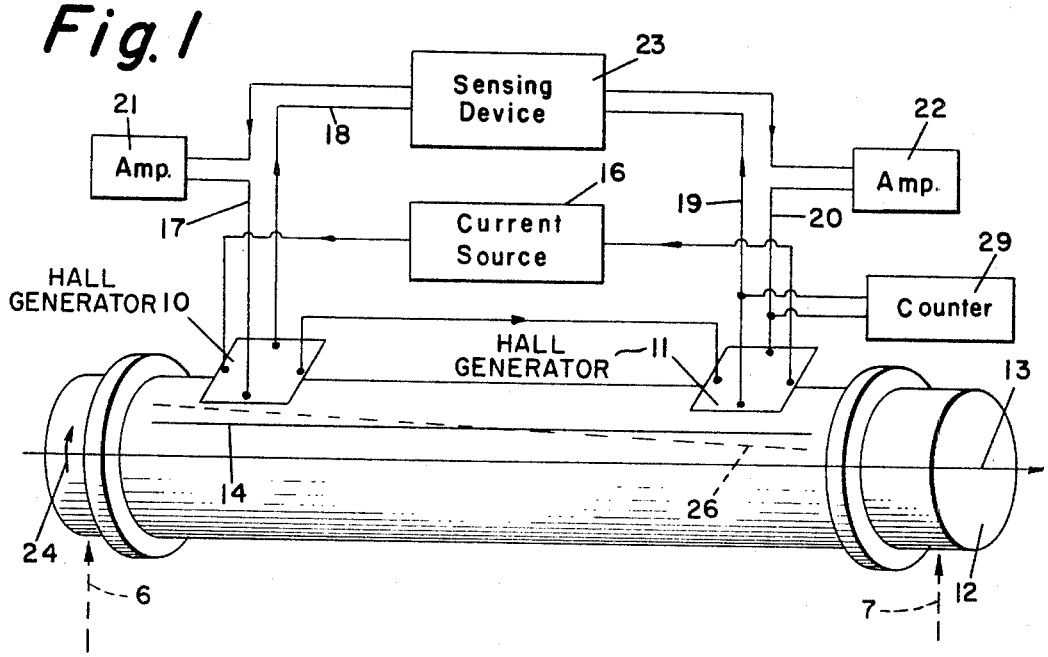

Sept. 20, 1966 H. SIPLER 3,273,386
TORQUE TRANSDUCER UTILIZING A MAGNETIZED SHAFT
HAVING A SURFACE DISCONTINUITY REFERENCE MARK
Filed Nov. 14, 1962 2 Sheets-Sheet 1

INVENTOR.
HARRY SIPLER
BY
S. J. Rotondi, A. J. Dupont + S. Pubroff
ATTORNEY

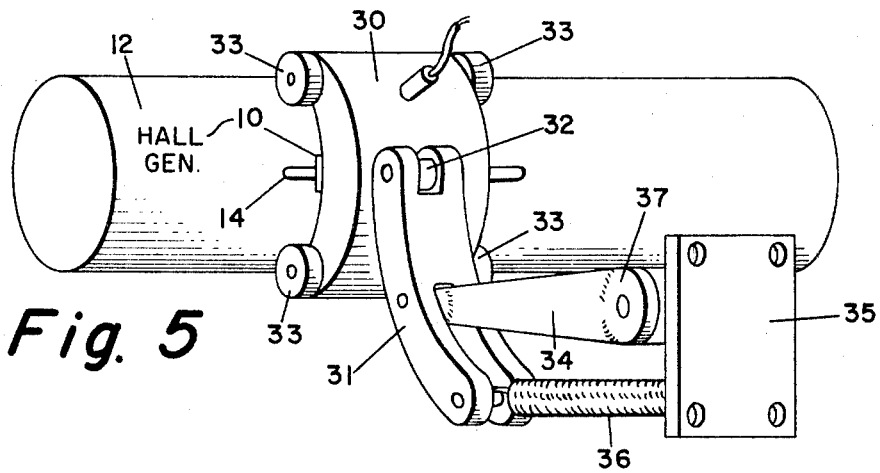
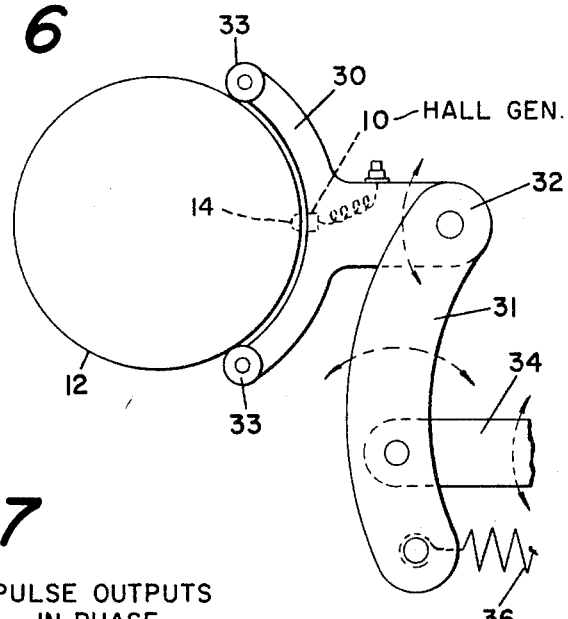
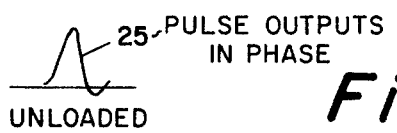
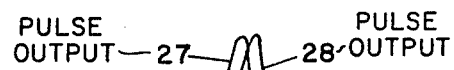

United States Patent Office 3,273,386
Patented Sept. 20, 1966

3,273,386
TORQUE TRANSDUCER UTILIZING A MAGNETIZED SHAFT HAVING A SURFACE DISCONTINUITY REFERENCE MARK
Harry Sipler, Philadephia, Pa., assignor to the United States of America as represented by the Secretary of the Army
Filed Nov. 14, 1962, Ser. No. 237,776
1 Claim. (Cl. 73—136)

The invention described herein may be manufactured and used by or for the Government for governmental purposes without the payment to me of any royalty thereon.

This invention relates to transducers such as are adapted to measure the torque applied to a shaft or the like. It provides an improved torque transducer which functions without any mechanical or electrical connection with the tested object.

Heretofore, such measurements have been made by means of strain gages which are cemented to the tested shaft and are connected through slip rings and brushes to a bridge circuit. This involves the difficulty that the shaft must be prepared for mounting the gages and slip rings and that complex electrical calibration and balancing of the strain-gage bridge circuit are required. The present invention avoids these difficulties by providing in the peripheral or outer surface of the tested shaft a linearly-extending magnetic field which (1) is parallel to the axis of the shaft in the unstressed condition thereof, and (2) has its ends displaced from one another circumferentially of the shaft when the shaft is subjected to torque. As will appear, the torque exerted through the shaft is readily deducible from this displacement of the ends of the linear magnetic field with respect to one another.

Measurement of this displacement is effected by means including a pair of Hall generators located at the opposite ends of the linear magnetic field. As is well known, a Hall generator is a rectangular crystal which functions in response to an electric current along its length dimension and a magnetic field across its thickness dimension to produce across its width dimension the Hall-effect output voltage which is proportional to the magnetic field. Hall generators of the Indium-compound type are capable of indicating very small changes in the relation between the positions of the generator and the magnetic field.

As is generally known, a sharp edge on a magnetized surface produces a narrow high density field. Thus if a sharp edge is made to appear on a magnetized shaft, and the shaft is rotated to bring the resulting narrow magnetic field to a position where it is directed across the thickness dimension of a Hall generator, an output voltage pulse is generated. If two Hall generators are placed, one at each end of the narrow magnetic field, they may be adjusted to give simultaneous pulses when the shaft is rotated unloaded. Under load, the twist of the shaft produced by the torque appears at a reference mark as a direct deformaiton or displacement. Thus, the mark reaches one generator before it reaches the other and the time-difference is directly relatable to a circumferential dimension for the observed rotational speed. This in turn can be applied to the calculations usually made for torque-load problems as hereinafter explained.

The invention will be better understood from the following description when considered in connection with the accompanying drawings and its scope is indicated by the appended claim.

Figure 2:
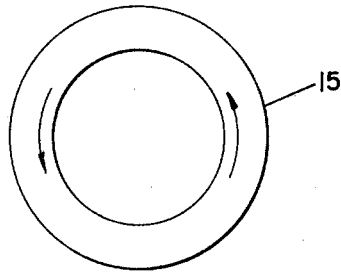
Figure 3:
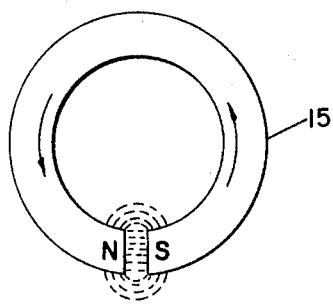
Figure 4:
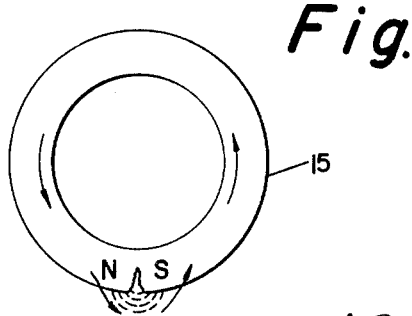

Referring to the drawings:

FIG. 1 is a diagrammatic representation of the torque transducer, the electrical components being shown as boxes bearing appropriate legends, FIGS. 2, 3, and 4 are explanatory figures relating to the distribution of magnetic flux in a magnetized shaft or tube, FIG. 5 is a perspective view of a suitable mount for the Hall generators, FIG. 6 is a partial end view of FIG. 5, and FIGS. 7 and 8 are explanatory diagrams relating to the output voltage pulses of the Hall generators.

The torque transducer of FIG. 1 includes a pair of Hall generators 10 and 11 which may be of the Indium-compound type and are positioned with their sides or plane surfaces slightly spaced from and tangent to the periphery of a shaft 12. These may be of the small thin wafer type as indicated, and are available commercially as Siemens-Halske Co. (Munich) Type FA24 and Ohio Semiconductors Co. Type HS–51, among others. The shaft 12 is magnetized by passing a direct current through it in an axial direction as indicated by the arrow 13 and has on its periphery a magnetic reference mark or line 14. This may be done momentarily through end contacts 6 and 7 temporarily connected with the shaft as indicated in doted outline. Thus there is no mechanical or electrical connection with the shaft during test, as hereinbefore noted. The shaft 12 may be replaced by a tube 15 (FIGS. 2 to 4). In either case, the magnetic flux is circular about the shaft axis and thus contained within the tested shaft or tube in the absence of sharp edges (FIG. 2). Thus the flux escapes more or less from the tested object along the contour of any sharp edges that may be present (FIGS. 3 and 4).

The reference line 14 is parallel to the axis of the shaft 12 and is in the form of a sharp edge or like element which produces a linear magnetic field extending from one of its ends to the other. It may consist of a scribed line, a welding bead or the like. Scribing, as is well known, is done with a sharp pointed instrument that cuts the surface and makes a groove therein which is the mark or line. In FIG. 3 an air gap provides the linear magnetic field and in FIG. 4 a dup scribe mark or V-groove likewise does this with two sharp edges.

From a source 16 (FIG. 1) an electric current is transmitted through the generators 10 and 11 along their length dimension. This current is acted upon by the magnetic flux or field extending outwardly from the reference line or mark 14 through the thickness dimension to produce across the width dimension at the output leads 17–18 of the generator 10 and at the output leads 19–20 of the generator 11 the Hall-effect output voltage which is proportional to the strength of that magnetic field as previously described. These output voltages are amplified by amplifiers 21 and 22 and applied to a comparator 23 or other sensing device, such as a digital computer of the type known commercially as a Libratrol 500 which has two pulse input circuits, or a dual-sweep oscilloscope of the Hewlett-Packard type—Model 122 AR—or the Tektronic Model 545 with 545CA adapter also having two pulse input circuits. Both read the time interval between the peaks of the spaced output pulses 27 and 28 as a measure of the torque for translation to foot-pounds or other units as will be seen.

When the shaft 12 is unloaded and rotated as indicated by the arrow 24, a voltage pulse is produced at the output leads of each of the generators 10 and 11. The sensing device 23 is so adjusted that these two voltage pulses occur at the same time (FIG. 7) and thus appear as one as indicated at 25, when the shaft is rotated in an unloaded condition. When the shaft is subjected to torque, however, the ends of the reference line 14 are displaced as indicated by the broken line 26, and the two produced voltage pulses, now indicated at 27 and 28 (FIG. 8), are thus displaced in phase or time as indicated.

Thus the tested shaft 12 deforms under the load by twisting on its axis. The ends of the reference line 14 are thus deflected in opposite directions, and the output pulses 27 and 28 are separated by a time interval proportional to the physical deflection. This is read by the computer or on the oscilloscope scale. How this data is utilized to determine the torque applied to the shaft is illustrated by the following example.

Taking an automotive propeller shaft (Ordnance part #7368814) with an outside diameter of 1.745", the time interval at 600 r.p.m. is found to be 0.4 millisecond. This interval multiplied by the velocity of the shafts surface or .0004 sec.×55" per sec.=0.022" deflection of the reference line 14. As applied to the known or calculated elasticity of the shaft, a 0.022 inch deflection corresponds to 7500 inch-pound of applied torque.

The output pulse of either generator may be used additionally to register the r.p.m. of the shaft by means of a counter 29 such as a frequency meter or a tachometer. Thus the same transducer functions to measure the twist of the shaft and the speed at which the twist occurs.

The means for supporting the Hall generators 10 and 11 may assume any suitable form. In FIGS. 5 and 6, such means are illustrated as comprising a yoke 30 which is coupled to a lever 31 through semi-ball joint 32 and terminates in nylon ball bearing rollers 33. The yoke 30 consists of non-magnetic material, and supports the generators midway between its forked ends at a distance from the shaft and the linear magnetic element 14 determined by the rollers 33. The lever 31 is pivoted to the end of an arm 34 which is hinged to a support 35. Extending between this support and the lower end of the lever 31 is a spiral spring 36. This construction has the advantage that the lever 31 and arm 34 are readily swung outwardly about the hinge 37 to remove the yoke 30 from the shaft 12. Other advantages of the present invention are that the electrical noise associated with brushes and slip rings is avoided, shielding from stray interference pickup is more easily effected, there is no wear of contacting devices such as that encountered in the use of strain gages, and indefinite reuse is possible whereas a strain gage assembly is destroyed by removing it from its cemented position.

I claim:

In a magnetic torque transducer, the combination with a round circularly-magnetized rotary shaft for torque transmission under variable load, of
  means providing a reference mark extending longitudinally in a straight line along the peripheral surface of said shaft substantially from end to end and defining a linearly-extending surface discontinuity and magnetic leakage field transversely thereacross,
  said last named means being thereby subject to deformation in opposite directions at its ends in response to torsional deformation of the shaft under load and proportional to the magnitude thereof,
  a pair of Hall generators of the rectangular-crystal Indium compound type having a relatively high degree of sensitivity to magnetic field change located in fixed spaced relation along said leakage field and aligned therewith to be traversed across the crystal thickness dimension by said field and to produce simultaneous voltage output pulses from said Hall generators for each revolution of the shaft without load and consecutive pulses under load having a relation in elapsed time proportional to the torque transmitted through said shaft,
  means connected with said generators for indicating the time relation between the pulses for each revolution as a measure for determining the torque load applied to the shaft, and
  means for applying magnetizing current to the shaft at rest between test operations to periodically restore the circular magnetization thereof, thereby to eliminate current conducting contact therewith in operation.

References Cited by the Examiner
UNITED STATES PATENTS

| | | | |
|---|---|---|---|
| 2,675,700 | 4/1954 | Van De Grift et al. | 73—136 |
| 2,754,464 | 7/1956 | Wizenez et al. | |
| 2,947,168 | 8/1960 | Yang | 73—136 |
| 2,978,902 | 4/1961 | Felder | 73—136 |
| 2,998,566 | 8/1961 | Cochran | 324—37 |
| 3,011,340 | 12/1961 | Dahle | 73—136 |
| 3,018,395 | 1/1962 | Carlstein | 324—70 |

FOREIGN PATENTS 600,980   4/1948   England.

WALTER L. CARLSON, *Primary Examiner.*

FREDERICK M. STRADER, *Examiner.*

C. W. HOFFMANN, M. J. LYNCH,
*Assistant Examiners.*